(12) United States Patent
Brycki et al.

(10) Patent No.: US 11,453,386 B2
(45) Date of Patent: Sep. 27, 2022

(54) HYBRID DRIVETRAIN FOR A HYBRID-DRIVEN VEHICLE AND METHOD FOR SAME

(71) Applicant: AUDI AG, Ingolstadt (DE)

(72) Inventors: Jan Brycki, Ingolstadt (DE); Thomas Perbandt, Donauwörth (DE)

(73) Assignee: AUDI AG, Ingolstadt (DE)

( * ) Notice: Subject to any disclaimer, the term of this patent is extended or adjusted under 35 U.S.C. 154(b) by 199 days.

(21) Appl. No.: 16/977,215

(22) PCT Filed: Feb. 14, 2019

(86) PCT No.: PCT/EP2019/053645
§ 371 (c)(1),
(2) Date: Sep. 1, 2020

(87) PCT Pub. No.: WO2019/170382
PCT Pub. Date: Sep. 12, 2019

(65) Prior Publication Data
US 2021/0009106 A1 Jan. 14, 2021

(30) Foreign Application Priority Data
Mar. 7, 2018 (DE) ..................... 10 2018 203 454.0

(51) Int. Cl.
*B60W 20/50* (2016.01)
*B60K 6/22* (2007.10)
(Continued)

(52) U.S. Cl.
CPC ............... *B60W 20/50* (2013.01); *B60K 6/22* (2013.01); *B60K 6/48* (2013.01); *B60W 10/06* (2013.01);
(Continued)

(58) Field of Classification Search
None
See application file for complete search history.

(56) References Cited

U.S. PATENT DOCUMENTS 9,340,203 B2 * 5/2016 Gibson ................. B60W 10/02

FOREIGN PATENT DOCUMENTS

DE 197 48 665 A1 5/1999
DE 199 39 250 A1 3/2001
(Continued)

OTHER PUBLICATIONS

International Preliminary Report on Patentability dated Sep. 8, 2020, in connection with corresponding International Application No. PCT/EP2019/053645 (7 pp.).
(Continued)

*Primary Examiner* — Dirk Wright
(74) *Attorney, Agent, or Firm* — Maier & Maier, PLLC

(57) ABSTRACT

A hybrid drivetrain for a hybrid-driven vehicle, having an internal combustion engine which outputs to vehicle wheels via a load path, in which a dual-mass flywheel is connected, which has flywheel masses elastically coupled via spring assemblies, and at least one electric machine, which can be coupled with respect to drive into the load path via an automatic transmission, wherein a drive torque (MBKM) from the internal combustion engine and a drive torque (MEM) from the electric machine can be added together with power addition in the automatic transmission to form a total drive torque, using which the vehicle wheels are drivable, and wherein an electronic control unit, on the basis of driving mode parameters and/or a driver intention, controls and engine controller of the internal combustion engine and/or power electronics of the electric machine using target torque specifications.

6 Claims, 2 Drawing Sheets

(51) Int. Cl.
*B60K 6/48* (2007.10)
*B60W 10/06* (2006.01)
*B60W 10/08* (2006.01)
*F16F 15/133* (2006.01)

(52) U.S. Cl.
CPC ........... *B60W 10/08* (2013.01); *F16F 15/133* (2013.01); *B60W 2710/06* (2013.01); *B60W 2710/08* (2013.01); *B60Y 2200/92* (2013.01); *B60Y 2300/58* (2013.01); *B60Y 2400/48* (2013.01)

(56) References Cited

FOREIGN PATENT DOCUMENTS

| DE | 10 2005 015 484 A1 | 5/2006 | |
|----|----|----|----|
| DE | 10 2005 040 769 A1 | 3/2007 | |
| DE | 10 2009 043 243 A1 | 5/2010 | |
| DE | 10 2015 200 067 A1 | 7/2015 | |
| DE | 10 2014 205 136 A1 | 9/2015 | |
| DE | 102014205136 A1 * | 9/2015 | ............... B60K 6/48 |
| DE | 10 2015 221 670 A1 | 12/2016 | |
| DE | 102015221670 A1 * | 12/2016 | |

OTHER PUBLICATIONS

German Examination Report dated Dec. 5, 2018 in corresponding German Application No. 10 2018 203 454.0; 14 pages including Machine-generated Translation attached.
International Search Report dated May 21, 2019 in corresponding International Application No. PCT/EP2019/053645; 6 pages.
Written Opinion dated May 21, 2019 in corresponding International Application No. PCT/EP2019/053645; 16 pages.
German Office Action dated Aug. 4, 2021, in connection with corresponding DE Application No. 10 2018 203 454.0 (13pp., including machine-generated English translation).

* cited by examiner

HYBRID DRIVETRAIN FOR A HYBRID-DRIVEN VEHICLE AND METHOD FOR SAME

FIELD

The invention relates to a hybrid drivetrain for a hybrid-driven vehicle and a method for operating such a hybrid drivetrain.

Such a hybrid drivetrain has, in addition to the internal combustion engine, an automatically shifting transmission, which can have a drive connection via an internal combustion engine shaft to the internal combustion engine and via an electric machine shaft to an electric machine. The automatic transmission can be designed in such a way that the electric machine is operable as a starter/generator, for gear shifting without interruption of traction in the transmission, for a solely electric driving mode, or for a hybrid mode; i.e., the electric machine is usable as the sole drive source or as an auxiliary drive source or as a starter or generator for power generation and recuperation. Such a hybrid drivetrain is known, for example, from DE 10 2005 040 769 A1.

In such a generic hybrid drivetrain, the internal combustion engine outputs to vehicle wheels via a load path. A dual-mass flywheel (DMF) is connected in the load path, which has flywheel masses elastically coupled via spring assemblies. The one electric machine of the hybrid drivetrain can be coupled with respect to drive into the load path via the automatic transmission. The drive torque from the internal combustion engine and the drive torque from the electric machine can be added together with power addition in the automatic transmission to form a total drive torque, using which the vehicle wheels are drivable.

The hybrid drivetrain additionally has an electronic control unit. In the driving mode, it controls, on the basis of driving mode parameters and/or a driver intention, an engine controller of the internal combustion engine, a transmission controller of the automatic transmission, and/or power electronics of the electric machine using specifications.

In the hybrid drivetrain, the electric machine can act as a starter during a startup procedure, using which a startup torque is transmitted to the internal combustion engine. In this case, the internal combustion engine is accelerated out of a standstill by the electric machine at very high speed gradients to the target speeds. However, in the dual-mass flywheel of the hybrid drivetrain, this can result in a DMF jam, which causes increased rotational irregularity, upon which the spring assemblies of the dual-mass flywheel are jammed in the compressed state.

Such a DMF jam can be recognized by means of a DMF evaluation unit. If such a DMF jam is present, the DMF evaluation unit generates an engine engagement signal, using which the engine controller activates the internal combustion engine with a torque surge to release the DMF jam.

The short-term torque buildup and dissipation accompanying the torque surge can result in vehicle accelerations in the driving mode. These accelerations are perceived to be unpleasant by the driver, since they are generated independently of the driver intention.

A method for operating a drivetrain is known from DE 10 2009 043 243 A1. A further drive device for motor vehicle is known from DE 10 2015 221 670 A1.

SUMMARY

The object of the invention is to provide a hybrid drivetrain for a hybrid-driven motor vehicle, in which the driving mode is made more comfortable in comparison to the above prior art.

The DMF evaluation unit, by means of which a DMF jam is identifiable, is associated with a compensation unit. This unit generates, on the basis of the torque surge, using which the DMF jam is to be released, a compensation signal, using which the electric machine is activatable by a compensation torque which compensates for the torque surge.

One core concept of the invention is thus that during a short-term torque buildup or dissipation to release the jammed dual-mass flywheel, a counteracting compensation torque is simultaneously applied to the drivetrain via the electric machine. In this case, the jamming of the dual-mass flywheel is thus released without the vehicle experiencing an additional acceleration. In this case, the compensation torque from the electric machine therefore counteracts the torque surge from the internal combustion engine in such a way that the torque surge remains without influence on the overall drive torque output to the vehicle wheels, so that the torque surge from the internal combustion engine takes place in a power neutral manner.

In a first embodiment, the torque surge initiated by the evaluation unit can be a sudden, short-term torque increase, while the counteracting compensation torque from the electric machine is a sudden, short-term torque reduction.

Alternatively thereto, the torque surge initiated by the evaluation unit can be a sudden, short-term torque reduction, while the counteracting compensation torque from the electric machine is a sudden, short-term torque increase.

An exemplary embodiment of the invention is described hereinafter on the basis of the appended figures.

BRIEF DESCRIPTION OF THE DRAWINGS

In the figures.

DETAILED DESCRIPTION

Figure 1:
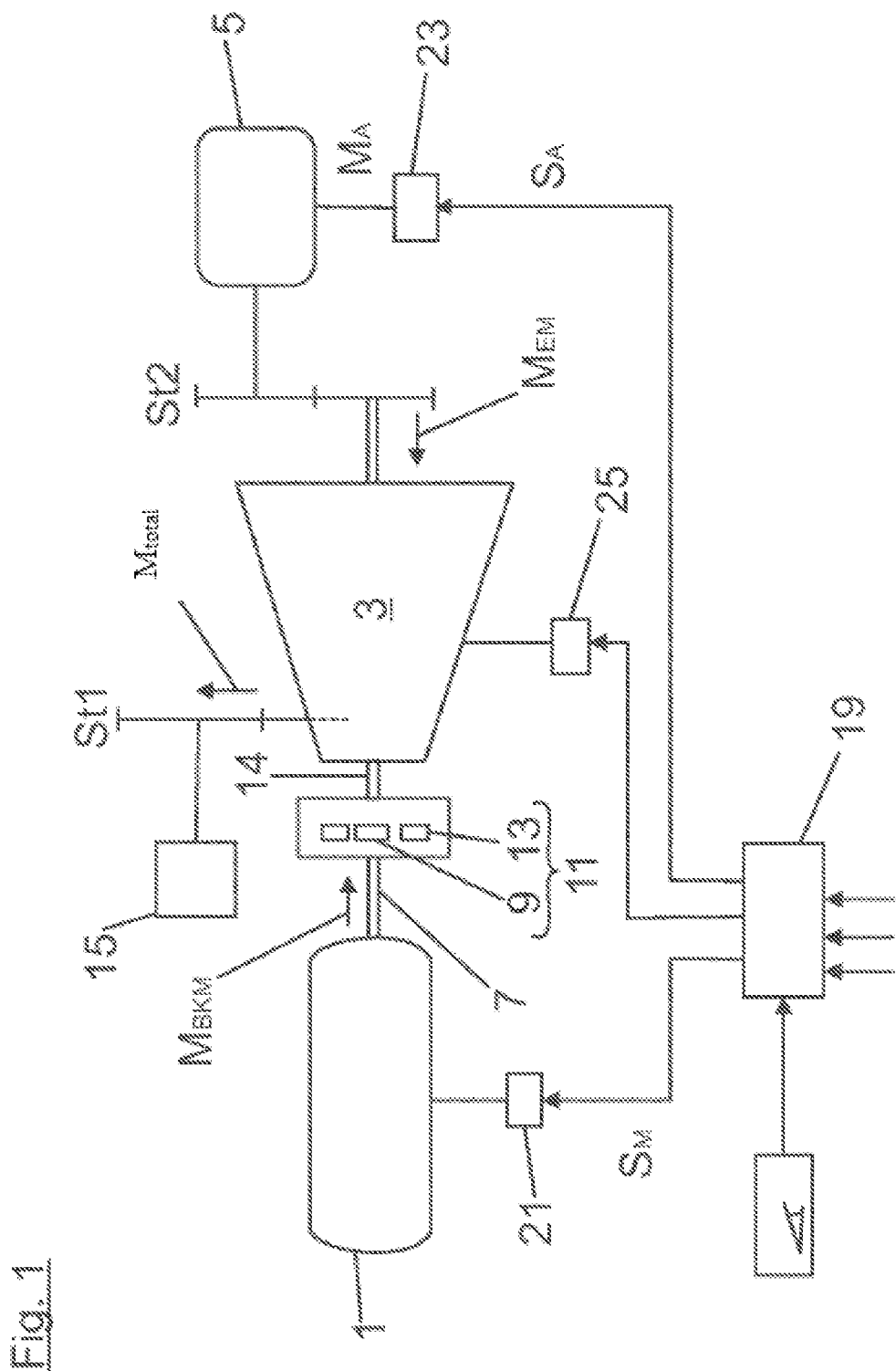
FIG. 1 shows a rough schematic block diagram of a hybrid drivetrain of a hybrid-driven motor vehicle.

A hybrid drivetrain shown in FIG. 1 has an internal combustion engine 1, an automatic transmission 3, and an electric machine 5. The internal combustion engine 1 is connected via an internal combustion engine shaft 7 to an internal-combustion-engine-side flywheel mass 9 of a dual-mass flywheel 11. Its transmission-side flywheel mass 13 is connected to a transmission input shaft 15 of the automatic transmission 3. Viewed in the circumferential direction, spring assemblies (not shown) act between the flywheel masses 9, 13. The automatic transmission 3 has an indicated spur gear step St1 on the output side, which has a drive connection to an axle differential 15 of a vehicle axle of the motor vehicle, whereby a load path results, via which a drive torque $M_{BKM}$ from the internal combustion engine can be output to the vehicle axis. Moreover, the electric machine 5 has a drive connection via an electric machine shaft 17 and via a second spur gear step St2 to the automatic transmission 3.

In the automatic transmission 3, depending on the set driving mode, the drive torque MEM generated by the electric machine 5 and the drive torque $M_{BKM}$ generated by the internal combustion engine 1 can be added up with power addition to form a total drive torque $M_{total}$, using which the vehicle axle is drivable. In contrast, in a startup procedure, the electric machine can act as a starter, using which a starting torque is transferred to the internal combustion engine 1. In this case, the internal combustion engine 1 is accelerated out of the standstill by the electric machine 5 at very high speed gradients to the target speeds. This can result in a DMF jam of the dual-mass flywheel 11 located in the hybrid drivetrain.

Figure 2:
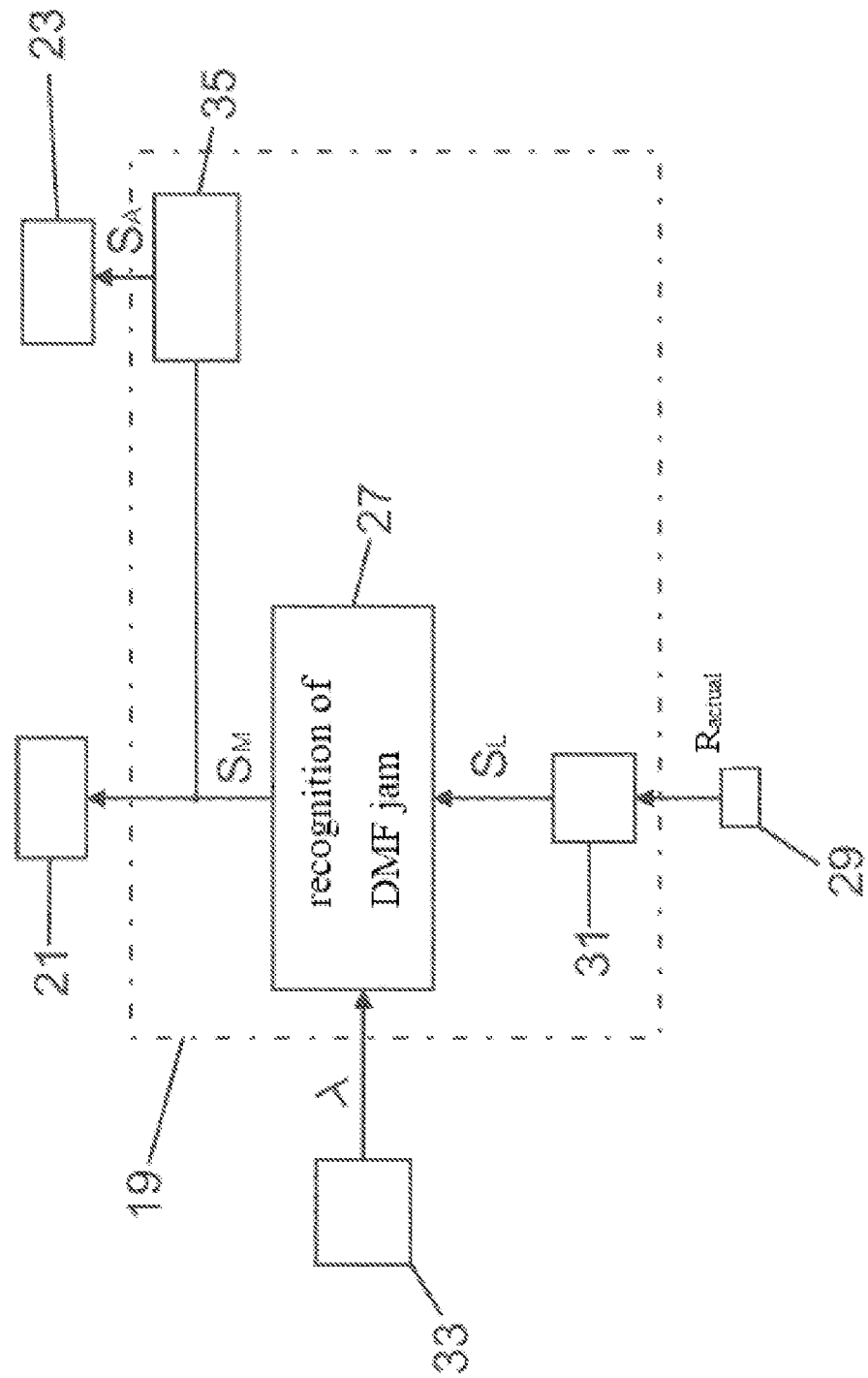
FIG. 2 shows a further block diagram of interconnected program components of an electronic control unit for implementing the invention.

The hybrid drivetrain shown in FIG. 1 furthermore has an electronic control unit 19, which, on the basis of driving mode parameters and a driver intention, activates an engine controller 21 of the internal combustion engine 1 and power electronics 23 of the electric machine 5 using target torque specifications and/or activates a transmission controller 25 of the automatic transmission 3 using shift signals for the gear shifting. FIG. 1 and FIG. 2 are produced with regard to simple comprehension of the invention. Therefore, the two figures are merely rough simplified illustrations, which do not reflect a realistic structure of the hybrid drivetrain or a realistic software architecture of the control unit 19 and the controllers 21, 23, 25.

The program components essential for the invention, by means of which the invention is implementable, are shown in FIG. 2. Accordingly, the electronic control unit 19 has a DMF evaluation unit 27, which detects whether a DMF jam exists or not. Such a DMF jam results in increased rotational irregularity, which is disadvantageous with regard to smooth-running behavior of the hybrid drivetrain. The DMF evaluation unit 27 is connected on the input side to a speed sensor 29, which detects an actual speed $n_{actual}$ in the hybrid drivetrain. In a processing unit 31 connected downstream with respect to signals, a noisy running signal $S_L$, which is applied to the signal input of the DMF evaluation unit 27, is computed from the actual speed $n_{actual}$.

Moreover, a lambda signal λ generated by a lambda regulator 33 is applied to the signal input of the DMF evaluation unit 27. By way of a comparison of the lambda signal λ to the noisy running signal $S_L$, a judgment is performed in the DMF evaluation unit 27 as to whether a DMF jam exists on the basis of these two parameters in the current operating situation.

If such a DMF jam, which causes increased rotational irregularity, is present, the DMF evaluation unit 27 generates an engine engagement signal $S_M$, using which the engine controller 21 activates the internal combustion engine 1 using a torque surge to release the DMF jam.

As is furthermore apparent from FIG. 2, the DMF evaluation unit 27 has a signal connection at a signal output to a compensation unit 35. In the compensation unit 35, a compensation signal is generated on the basis of the torque engagement signal $S_M$, using which the power electronics 23 activates the electric machine 5 using a compensation torque $M_A$, which compensates for the torque surge or counteracts it.

In this case, the compensation torque $M_A$ from the electric machine counteracts the torque surge from the internal combustion engine in such a way that the torque surge remains without influence on the total output torque $M_{total}$ output to the vehicle wheels, whereby the torque surge takes place in a power-neutral manner, so that vehicle accelerations unpleasant to the driver do not occur due to the torque surge.

The above-mentioned DMF evaluation unit 27 for recognizing a DMF jam can be integrated into a misfire recognition function, as described in DE 10 2015 221 670 A1. Therefore, reference is expressly made to this document.

The invention claimed is:

1. A hybrid drivetrain for a hybrid-driven vehicle, comprising:
an internal combustion engine which outputs to vehicle wheels via a load path, in which a dual-mass flywheel is connected, which has flywheel masses elastically coupled via spring assemblies, and an electric machine, which can be coupled with respect to drive into the load path via an automatic transmission, wherein a drive torque from the internal combustion engine and a drive torque from the electric machine can be added together with power addition in the automatic transmission to form a total drive torque, by which the vehicle wheels are drivable, and wherein an electronic control unit, on the basis of driving mode parameters and a driver intention, activates an engine controller of the internal combustion engine and/or power electronics of the electric machine using target torque specifications, and wherein the drivetrain has an evaluation unit, which recognizes the presence of a DMF jam causing increased rotational irregularity, in which the spring assemblies of the dual-mass flywheel are jammed in the compressed state, and the evaluation unit generates an engine intervention signal upon the presence of a DMF jam, by which the engine controller controls the internal combustion engine using a torque surge to release the DMF jam, wherein the evaluation unit is associated with a compensation unit, which generates a compensation signal on the basis of the torque surge, by means of which the electric machine is activatable using a compensation torque, which compensates for the torque surge.

2. The hybrid drivetrain as claimed in claim 1, wherein the compensation torque from the electric machine counteracts the torque surge from the internal combustion engine in such a way that the torque surge remains without influence on the total output torque output on the vehicle wheels, i.e., the torque surge takes place in a power-neutral manner.

3. The hybrid drivetrain as claimed in claim 1, wherein the torque surge initiated by the evaluation unit is a sudden, short-term torque increase and the counteracting compensation torque is a sudden, short-term torque reduction.

4. The hybrid drivetrain as claimed in claim 1, wherein the torque surge initiated by the evaluation unit is a sudden, short-term torque reduction and the counteracting compensation torque is a sudden, short-term torque increase.

5. The hybrid drivetrain as claimed in claim 2, wherein the torque surge initiated by the evaluation unit is a sudden, short-term torque increase and the counteracting compensation torque is a sudden, short-term torque reduction.

6. The hybrid drivetrain as claimed in claim 2, wherein the torque surge initiated by the evaluation unit is a sudden, short-term torque reduction and the counteracting compensation torque is a sudden, short-term torque increase.

* * * * *